United States Patent
Paulsen

[15] 3,646,684
[45] Mar. 7, 1972

[54] DEPTH-FINDING DEVICE

[72] Inventor: Glen E. Paulsen, Minneapolis, Minn.
[73] Assignee: T.O. Plastics, St. Paul, Minn.
[22] Filed: Oct. 2, 1969
[21] Appl. No.: 863,102

[52] U.S. Cl. ..........................33/126.5, 33/217, 242/85.1, 242/125
[51] Int. Cl. .................................................G01b 3/00
[58] Field of Search..............33/126, 126.5, 216, 217, 218; 242/84.2 J, 85, 125; 43/43.11

[56] References Cited

UNITED STATES PATENTS

| | | | |
|---|---|---|---|
| 2,499,722 | 3/1950 | Chesbro | 33/217 |
| 2,683,937 | 7/1954 | Criswell | 33/217 |
| 2,684,550 | 7/1954 | Reid | 242/84.2 J X |

FOREIGN PATENTS OR APPLICATIONS

| 10,725 | 1911 | Great Britain | 242/85.1 |
|---|---|---|---|

Primary Examiner—William D. Martin, Jr.
Attorney—Robert M. Dunning

[57] ABSTRACT

A depth finder comprises a float body having a peripheral continuous groove encircling the same, the groove corresponding in length to a standard length unit. A line is anchored to the float at one end, and a weight is attached to the other end of the line. The number of turns of line unwound from or wound upon the float as the weight is drawn from, or dropped into a body of water may serve to indicate the depth of the body of water.

9 Claims, 3 Drawing Figures

PATENTED MAR 7 1972　　　　　　　　　　　　3,646,684

INVENTOR
GLEN E. PAULSEN

BY *[signature]*

ATTORNEY

DEPTH-FINDING DEVICE

This invention relates to an improvement in depth-finding device and deals particularly with a simple and effective means of measuring the depth of a body of water.

BACKGROUND OF THE INVENTION

There are many occasions where it is desirable to determine the depth of a body of water. Fishermen often desire to know the water depth, as fish are often caught along underwater reefs. It is often desired to determine water depth so as to know if boats of various sizes may safely travel. It is an object of the present invention to provide a device which is extremely simple in construction, may be made at very low cost, and which yet effectively serves its intended purpose.

SUMMARY OF THE INVENTION

An object of the present invention resides in the provision of a float including a body of material capable of floating on the surface of a body of water. A peripheral groove extends continuously about the body of the float, preferably on a single plane. The groove is formed so that the length of the periphery is equal to a standard measurement of length. For example, the float body may be produced so that the periphery of the groove at or near its base may be 1 foot. A flexible line is anchored at one end to the float body, and is wound about the float in the groove. The other end of the line is connected to a weight, or a body of material of greater specific weight than that of water. In operating the device, it is only necessary to unwind the line from the float body until the weight strikes the bottom. As the weight is pulled upwardly, the number of turns of the line wound upon the float body is counted. The depth of the water is determined by merely multiplying the number of turns required to raise the weight by the length of the periphery of the float.

A feature of the present invention resides in a device of the type described having detachable means thereon for holding the line from unwinding. This means may comprise merely a U-shaped spring clip frictionally engaging over the groove accommodating the line. The clip may, if desired, have an apertured edge through which the line may extend to prevent the accidental loss of the clip if it falls into the water.

A further feature of the present invention resides in a device of the type described which includes a recess for accommodating the weight when the device is not in use. The float is preferably made of foam plastic or expanded plastic beads which is of a somewhat resilient nature. When the float is cast with a recess of slightly smaller dimensions than the dimensions of the weight, the weight may be frictionally held in place when pushed into the recess.

An added feature of the present invention resides in the provision of a simple handle by means of which the float may be grasped to hold the float from rotation as the line is wound or unwound. The float may be held stationary with one hand, and the line may be wound about the float body with the other.

A further feature of the present invention resides in the provision of a device of the type described which may be used as a marker. In order to use the device in this manner, the line is unreeled from the float until the weight strikes the bottom, and somewhat more line is let out as play. The clip is then used to prevent the remainder of the line from from unwinding. The device may be left in this spot so that the spot may again be readily located.

A further feature of the present invention resides in the provision of a device which may also serve as a locating device in the event some object is dropped into the water. In this event, it is only necessary to grab the float, pull the weight out of its recess, and detach the clip. The device may then be thrown as nearly as possible to the spot at which the object fell into the water and the weight will sink to the bottom. The line may later be wound to take up the slack and serve as a marker for the lost object.

These and other objects and novel features of the present invention will be more clearly and fully set forth in the following specification and claims.

DESCRIPTION OF THE PREFERRED EMBODIMENT

Figure 1:
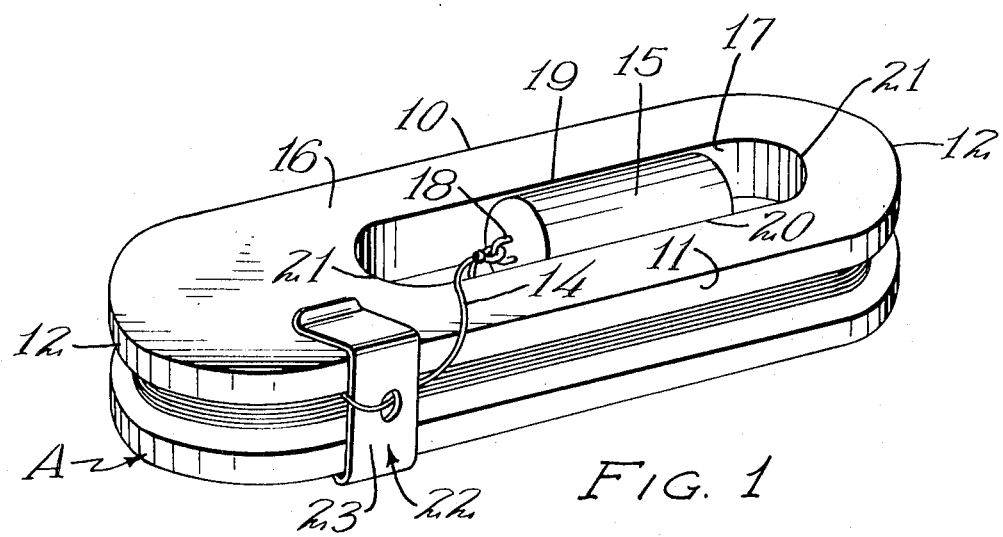
FIG. 1 is a perspective view of the device in condition for storing.
Figure 2:
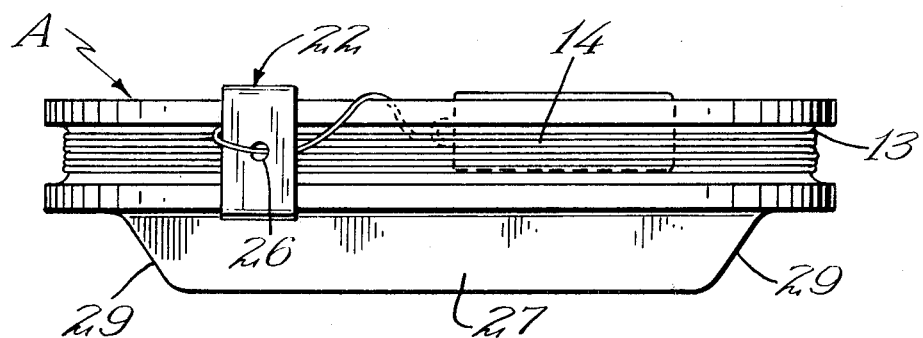
FIG. 2 is a side elevational view of the same.
Figure 3:
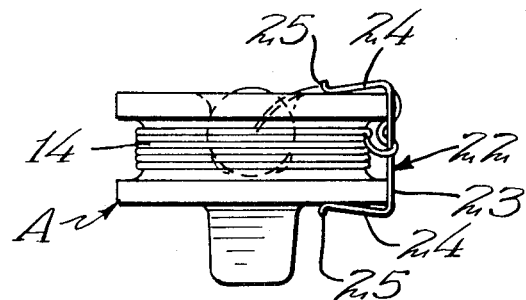
FIG. 3 is an end elevational view of the same.

The depth marker is indicated in general by the letter A. In the particular arrangement illustrated, the float comprises an elongated strip of buoyant material such as expanded plastic although other types of material could be used. The float body is shown as having generally parallel sides 10 and 11 and rounded ends 12 forming a generally oval-shaped body. The major portion of the float as shown is of equal thickness. The side and end walls are provided with a peripheral groove 13 which is of generally U-shaped form in section. The groove may be of the same shape about the entire periphery of the float. However, the depth of the groove is such that the periphery of the groove near the base may be equal some standard unit of length. For example, the peripheral distance about the float indicated in the present application is 12 inches or 1 foot. This particular unit of length is desirable because the device is small enough so that it can be carried in a tackle box or similar container, and at the same time is long enough so that excessive time will not be required to wind and unwind the line.

Line 14 may be of any suitable material, and in the particular arrangement illustrated comprises nylon fishing line. One end of the line 14 is anchored to the float in any convenient manner not illustrated in the drawing. About 50 feet of such line may be wound about the float without the buildup of the line causing much noticeable variation in length of the various convolutions. A weight 15 is secured to the other end of the line 14 in any suitable manner such as by tying the line to a loop 18 on one end of the cylindrical weight.

The upper surface 16 of the float body is provided with an elongated recess 17 intermediate its sides 10 and 11 and spaced from the ends 12. The shape of the recess generally simulates the shape of the float, and includes parallel sides 19 and 20, and rounded ends 21. If the float is made of slightly resilient material, the sidewalls 19 and 20 are parallel and spaced apart a distance which is slightly less than the diameter of the weight 15. As a result, when the weight is pushed into the recess 17, it is frictionally engaged in place.

The means for preventing accidental unwinding of the line 14 comprises a U-shaped spring clip having a base portion 23 to the ends of which are connected spring arms 24 which normally incline somewhat toward one another and which terminate in outward directed ends 25 so that the clip may be slid on and off of the float body. Normally the base portion 23 of the clip is provided with an aperture 26 through which the line 14 may extend if it is so desired. Having the clip 22 threaded on the line 14 prevents accidental loss through dropping it in the water of the like. When the device is used as a depth gauge, the clip may be merely disengaged from the float and dropped into the water with the weight 15. When sufficient line has been played out and the weight reaches the bottom, any slack line is wound upon the float.

To simplify the task of holding the float while winding up the line, an elongated rib 27 having outwardly and upwardly inclined ends 29 may project downwardly from the center of the float body. This rib may be grasped in one hand, and the float may be held in a vertical position while the line is reeled up thereon. By counting the convolutions and multiplying this number by the length of each convolution, the depth of the body of water may be easily and quickly determined.

When using the device as a marker, the same general procedure may be followed except for the fact that the clip is either removed or held so that the line may slip through the clip as the line is lowered. With the weight on the bottom, and the desired extra amount of line is unwound the clip 22 may be reapplied to the float to prevent the remainder of the line from unwinding.

I claim:
1. A depth indicator including:
   an elongated float body having substantially parallel sides and rounded ends,
   said body having a continuing peripheral groove therein on a common plane extending along said parallel sides and rounded ends, and the peripheral length of which corresponds to a standard unit of length,
   a flexible line anchored at one end to said float body and wound about said body in said groove,
   each convolution of said line being of substantially equal length to said standard unit of length,
   a weight secured to the other end of said line having a specific gravity greater than that of water, and
   releasable attaching means engaging a portion of said line intermediate the ends thereof,
   said releasable attaching means spanning said groove and holding the portion of said line between said releasable attaching means and said one end of said line from unwinding from said float.
2. The structure of claim 1 and in which said float body is made of resilient plastic material, and includes a longitudinally extending recess in which said weight may be resiliently engaged.
3. The structure of claim 2 and in which said weight may be frictionally engaged in said recess.
4. The structure of claim 1 and in which said body includes handle means by means of which said body may be engaged, said handle being on one side of said groove.
5. The structure of claim 4 in which said handle means comprises an elongated rib on said float body.
6. The structure of claim 5 and in which said rib extends substantially parallel to said substantially parallel sides of said body.
7. A depth indicator including:
   a float body,
   said body having a continuing peripheral groove therein on a common plane and the peripheral length of which corresponds to a standard unit of length,
   A flexible line anchored at one to said float body and wound about said body in said groove,
   A weight secured to the other end of said line having a specific gravity greater than that of water, and releasable attaching means engaging a portion of said line intermediate the ends thereof to said float to hold the portion of said line between said releasable attaching means and said one end of said line from unwinding from said float,
   said releasable attaching means comprising a generally U-shaped resilient clip engageable with said float on opposite sides of said groove.
8. The structure of claim 7 and in which said clip includes an aperture through which said line extends.
9. The structure of claim 7 and in which the intermediate portion of said clip includes an aperture through which said line extends.

* * * * *